Feb. 12, 1957     L. G. COPEMAN     2,781,159
MOISTURE IMPERVIOUS CONTAINER
Filed May 27, 1953     2 Sheets-Sheet 1
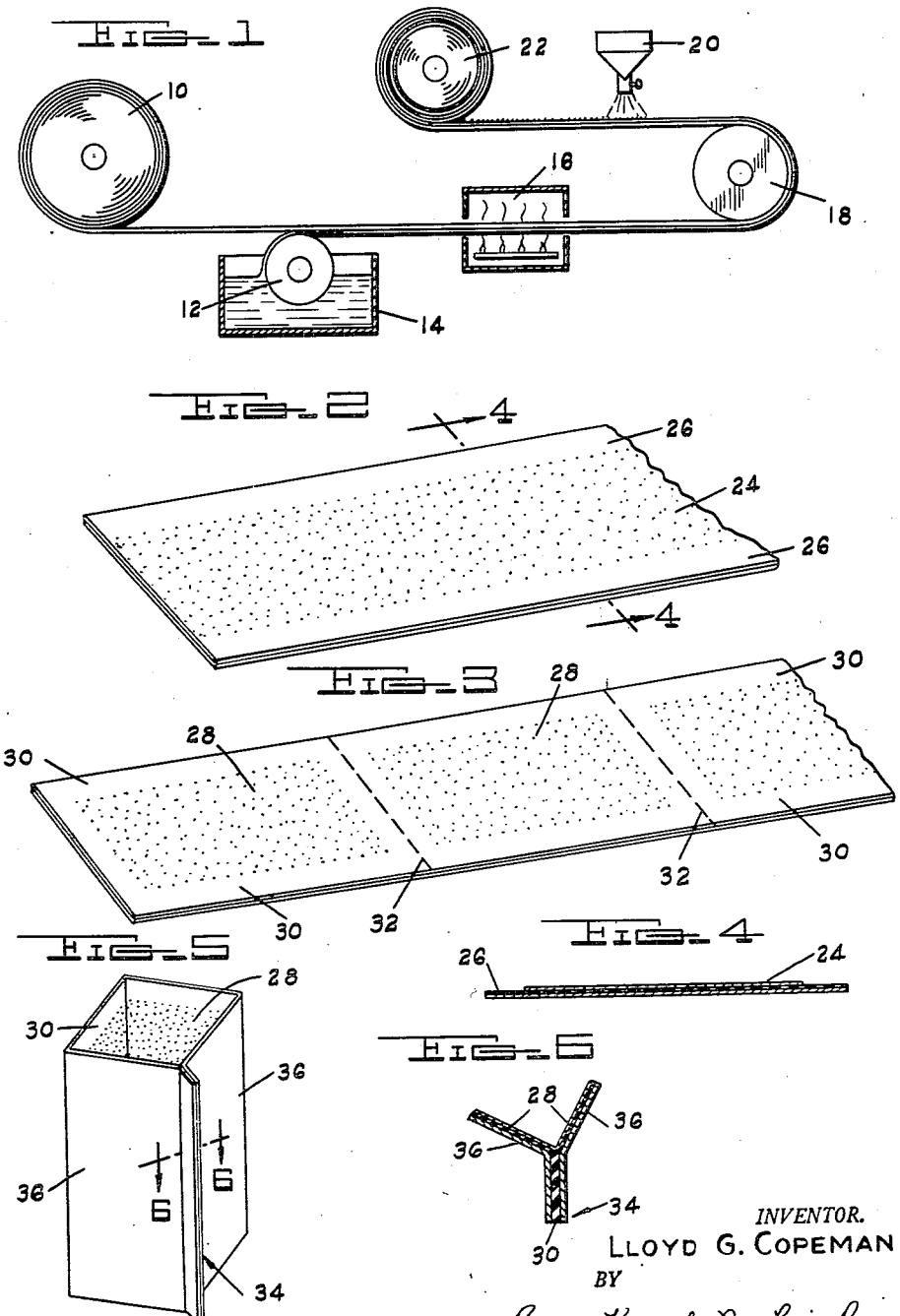
INVENTOR.
LLOYD G. COPEMAN
BY
Barnes, Kisserle, Laughlin + Rauch
ATTORNEYS Feb. 12, 1957          L. G. COPEMAN          2,781,159
MOISTURE IMPERVIOUS CONTAINER
Filed May 27, 1953          2 Sheets-Sheet 2
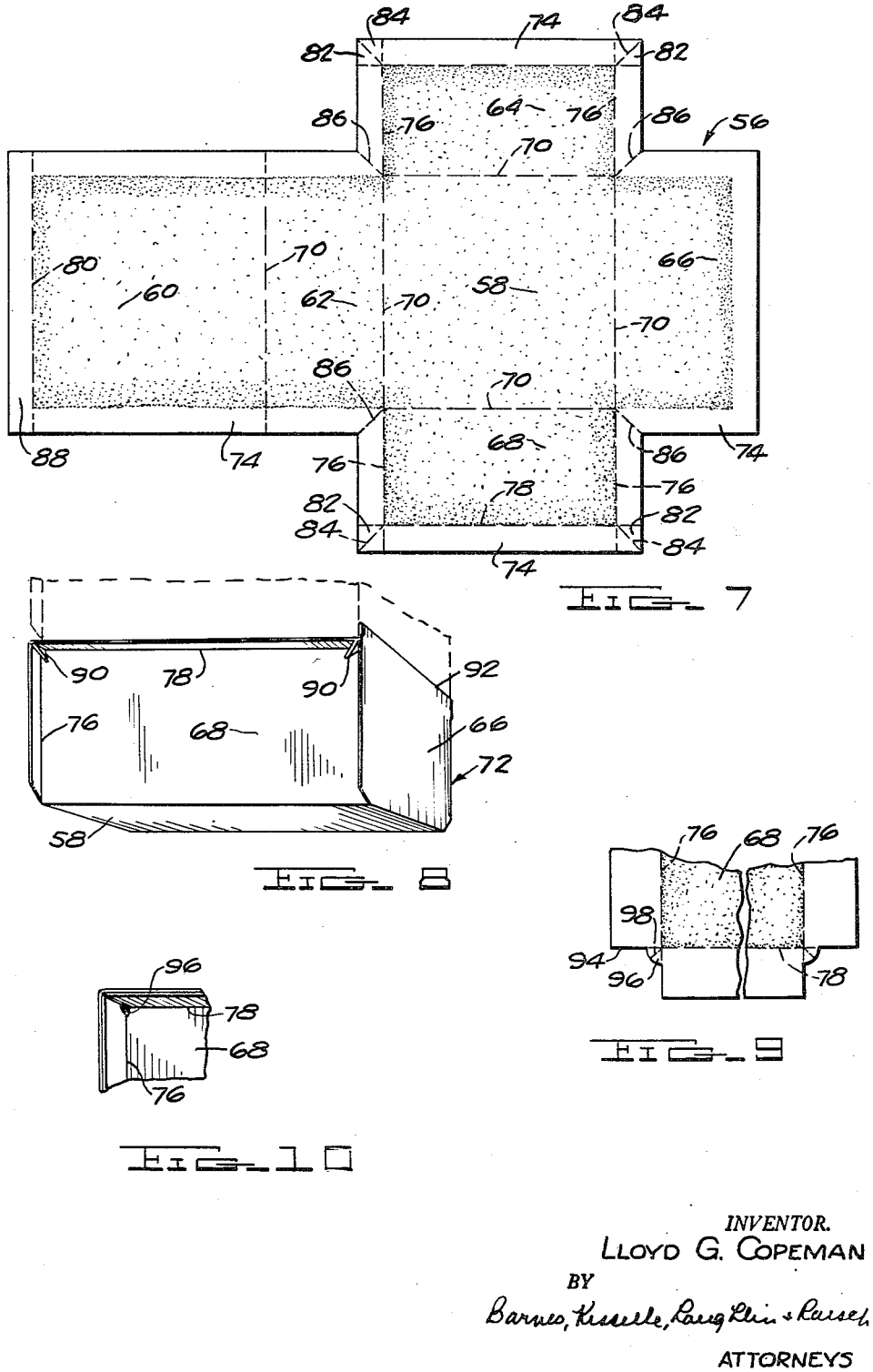
INVENTOR.
LLOYD G. COPEMAN
BY
ATTORNEYS

2,781,159

MOISTURE IMPERVIOUS CONTAINER

Lloyd G. Copeman, Metamora, Mich.; Elizabeth Jane Gerlach, executrix of said Lloyd G. Copeman, deceased Application May 27, 1953, Serial No. 357,711

2 Claims. (Cl. 229—16)

This invention relates to a moisture impervious container, and has to do particularly with the forming of a package, the moisture impervious walls of which are formed of a homogeneous sheet of rubber.

This application is a continuation-in-part of my prior copending application Serial No. 688,985, filed August 7, 1946, now abandoned.

As disclosed in my Patent No. 2,020,255 it has heretofore been customary in the temporary sealing of articles to coat the article to be protected with an aqueous disperson of rubber such as latex, and to apply paper to the latex or similar material while still plastic, the paper absorbing the water from the latex and causing the latex to set up into a homogeneous sheet of rubber; or the aqueous dispersion of rubber has been applied to the paper and the treated paper applied to the surface to be protected while the latex was still plastic. It has also been the practice heretofore, as disclosed in my Patent No. 2,075,178 to form a package in which one or more articles are coated on both sides with a layer of rubber deposited from latex or the like, and the latex around the edge of the article secured to itself to form a continuous homogeneous strip of rubber around the edges of the article or articles, the latex layers being backed by paper.

Still other prior art patents have included the use of laminated paper as a permanent paper which maintains the seal even though the paper is ruptured, such as disclosed in my Patent No. 1,976,329.

It is the object of the present invention to provide a moisture proof package of such construction that walls of the package are formed of a continuous sheet of rubber, such as that deposited from an aqueous dispersion of rubber. The present invention differs from what has been done in the past in that certain surfaces of this homogeneous sheet of deposited rubber are so fabricated and/or protected that such surfaces may be contacted with each other to assist in forming and sealing the container or package while other surfaces will be impervious to any adhesive action therebetween.

Another object of the invention is to provide a unique corner construction for a container which insures a hermetic seal.

Certain features of the invention reside in novel method steps in the preparation of flat blanks for forming the hermetically sealed containers. One side of a sheet of continuous paper may be coated with a layer of uncured latex, natural or compounded, and this layer of latex then set up until substantially cured. Certain portions of the semi-cured latex may be coated with various substances leaving exposed portions of the uncured surface, such continuous roll of paper and latex may then be rolled up ready for dispensing, the rolled up form of paper and latex keeping out the air and retaining the deposited rubber in its substantially but not completely cured form. When unrolled, strips of paper may be so folded that the uncured portions contacting each other will form the package and seal the same while the coated or completely cured portions of rubber will form the main part of the package which will not be affected even though the adjacent surfaces contact each other.

Other features have to do with various steps in the process and structural features of the flat forms and packages formed therefrom, as will be more clearly set forth in the specification and claims.

In the drawings:

Figure 1 is a more or less diagrammatic view illustrating one manner of processing the continuous roll of paper.

Figure 2 is an enlarged fragmentary perspective view showing the surface of a portion of the continuous length of paper, the center portion of the latex surface of which has been dusted.

Figure 3 is a plan view similar to Figure 2 but showing the dusting applied at spaced intervals so as to form a continuous undusted portion around the edge of each section.

Figure 4 is a sectional view taken on line 4—4 of Figure 2.

Figure 5 illustrates a section such as shown in Figure 3, partly assembled.

Figure 6 is a sectional view taken on line 6—6 of Figure 5 showing the longitudinal vertical edges of the package shown in Figure 5 as being hermetically sealed together.

Figure 7 is a plan view of a blank for forming another modified form of container.

Figure 8 is a perspective view of a container formed from the blank shown in Figure 11.

Figure 9 is a fragmentary view of still another form of blank construction.

Figure 10 is a fragmentary perspective view of a container formed from the blank shown in Figure 13.

Referring now to Figures 1, 2, and 3, the process there illustrated diagrammatically comprises feeding sheet stock such as paper or similar material from a reel 10 over a coating roller 12 which feeds coating composition from a tank 14 to the under surface of the sheet stock. In carrying out the process, I preferably use what is commonly known as latex but it will be understood that I may use aqueous dispersions of rubber in general whether natural or artificial or any other coating substance applied in a fluid state and preferably held in solution by a solvent. Substantially any of the well-known types of latex may be used and such different types of latex may be used either in their original state or concentrated or diluted or compounded, if desired.

The latex may be applied by other well-known methods such as spraying and it may be applied, if desired, to both surfaces of the sheet stock by dipping or another method. The stock thus coated is carried to a curing device such as the oven 16 which is so regulated as to temperature and feeding speed of the stock as to not completely cure the latex. The curing is carried out only sufficiently to impart to the latex coating a surface which is non-tacky but yet cohesive, that is, it will adhere to itself when brought into contact. After heating, the stock passes over a suitable roller 18 and then under a treating device 20 for the purpose of rendering portions of the coated surface non-adherent, and non-cohesive. Thereafter the stock passes to a take-up roll 22 where it is wound upon itself in a roll.

The treating device 20 preferably comprises a dispenser for pulverulent material such as talc, soap stone, graphite, powdered mica, chalk, or other analogous material having the property of rendering the semi-cured latex surface non-adherent to itself. The dispensing device 20 may be provided with suitable automatic discharge mechanism which limits the area treated to certain zones depending upon the use to which the stock is later to be put. For example, the stock may be powdered over a continuous zone extending the full length of the strip terminating short of the edges thereof as shown in Figure 2. Thus the zone 24 is treated with the pulverulent material to render it non-adherent and non-cohesive while the zones 26 at either edge retain their self-adherent or cohesive properties. Stock of this type may be used to form containers of irregular type by folding sections of the stock cut from the strip upon themselves and sealing the edges 26 by bringing them into contact with light pressure.

More conveniently, however, the stock may be treated in intermittent zones 28 as shown in Figure 3 to render these zones non-adherent and non-cohesive and the strip then rolled upon itself until it is ready for use. The cohesive zones 30 surrounding the zones 28 will adhere only slightly to the back of the sheet stock of an adjacent layer in the roll 22, but sufficiently to the latex coating in its semi-cured state and excluding air therefrom to prevent further curing.

When the stock is ready to be made into boxes, the strip may be unrolled and cut into sections along the dotted lines 32. The stock is then folded into the shape illustrated in Figure 5 and the adjacent edges 30 along the vertical seam 34 are pressed into contact. There is thus provided a box having four vertical walls 36 with three folded corners and one seam corner at 34. The container thus formed has a continuous imperforate coating extending along its entire inner surface, which coating moreover serves not only to impart moisture imperviousness to the walls of the container but at the same time serves as the means whereby the seams of the container may be sealed together with greater facility.

I have found that the use of a self-adherent or cohesive coating of this nature on two surfaces of a container seam permits the seam to be sealed tightly by a homogeneous mass of semi-cured rubber which instantly forms as soon as the surfaces are brought into contact. Thus no heat or wetting with a solvent is required and only such moderate pressing as can be exerted with the fingers is required to form a perfect homogeneous seal. At the same time, the seal in the seam is an integral part of the moisture barrier for the container as a whole. In addition, both the moisture proofing of the container and the provision of a sealing material for the seams can be obtained by a single coating operation.

In Figures 7 and 8 there is illustrated another form of blank and the container adapted to be formed therefrom. The blank, generally designated 56, comprises a single cut-out sheet having a square or rectangular bottom wall panel 58, a correspondingly shaped top wall panel 60 and side wall panels 62, 64, 66 and 68. These panels are defined on their adjoining sides by the score lines 70 about which the panels are adapted to be folded to form the container, generally designated 72 in Figure 8. The blank 56 is coated in a manner similar to that described above with reference to Figs. 1 to 6, the edge portions 74 which extend around the periphery of the blank being provided with the substantially non-tacky cohesive latex coating while the central body portions are additionally treated to render them non-adhesive and non-coherent.

In order to facilitate assembly of blank 56 into container 72, the blank is scored additionally as at 76 and 78 around the edges of the side wall panels 64 and 68 and also at 80 adjacent the end edge of the top wall panel 60. It will be observed that the score lines 76 and 78 extend to the respective edges of side wall panels 64 and 68 and thereby form, at the outside corners of these side walls, square areas 82 which are additionally scored in a diagonal direction as at 84, thus dividing the areas 82 into two triangular portions. Additional diagonally extending score lines 86 are also formed at each inside corner formed by the intersecting edge portions 74 adjacent the corners of the bottom wall panel 58.

The blank 56 is formed into the container 72 by folding the wall panels 62, 64, 66 and 68 upwardly about the score lines 70, into planes perpendicular to the bottom wall panel 58. By reason of the score lines 76, 78 and 86 it will be observed that the side wall panels 62 and 66 remain substantially flat, whereas the peripheral edge portions 74 of panels 64 and 68 automatically fold flatly against the corresponding edge portions of the panels 62 and 66. The diagonally extending score lines 86, it will be observed, facilitate this operation and at the same time form a closer corner construction which provides a hermetic seal at these corners of the container. Then, after the container is filled with the intended contents, the top wall panel 60 is folded downwardly about the score line 70, which is common to panels 60 and 62, so that the peripheral edge portions thereof along each side contact the upper folded flat portions of panels 64 and 68. The extreme end flap 88 is folded upwardly so as to join with the upper peripheral edge portion of side wall panel 66. In this connection it will be noted that when the blank 56 is folded in this manner the square corner portions 82 are caused to fold along the diagonal score lines 84 so as to provide triangular pleats 90 at these corners, which provide not only a rigid corner construction but also a hermetic seal.

In the showing of Figure 8 these triangularly pleated portions 90 are folded outwardly. If desired, they may be folded inwardly so that in the finished container these pleated portions 90 will be disposed between the peripheral flap portions of the side wall panels 64 and 68 and the top wall panel 60. It will also be observed that by providing the score line 80 on the panel 60 rather than on the panel 66, a vertically extending flap 92 is provided on the container which forms a stacking edge or guide which facilitates stacking the containers one upon another for shipment as indicated by the broken line showing in Figure 8.

In Figures 9 and 10 there is illustrated a slightly modified form of corner construction of the areas designated 82 on the blank of Figure 7. In this form of construction the outside corners of panels 64 and 68 are provided with a generally right angle notched portion 94 which, at the apex of the angle is formed with a fillet portion 96. This fillet portion may, if desired, be provided with a score line 98. In other respects the blank illustrated in Figure 9 is the same as blank 56 shown in Figure 7.

When the blank of Figure 9 is folded into a container, the upper corners of the container take the form illustrated in Figure 10; the triangular pleated portion 90 of the container shown in Figure 8 is eliminated and a neat, right angle corner is formed. The fillet portion 96 simply provides an excess latex coated sheet for positively insuring the hermetic sealing of the corner. If the fillet portions 96 were not employed in conjunction with the notches 94, there would always be a possiblity that unless the container were very carefully folded and sealed, a tiny pinhole or the like would occur at the very corners of the container. Therefore, it is preferred to employ the corner construction shown in either Figure 7 or Figure 9, where it is contemplated that the containers be assembled on automatic machinery designed for this purpose.

It will be appreciated that the material of this invention would be shipped to the customer in the form of stacked blanks or in the form of rolls. In either case the overlaying of the latex surface with another layer of blank material, either by reason or being in the form of rolls or by being in stacks, would seal the air from the cohesive latex coating and thereby effectively prevent further curing of the latex, so that when the blanks are dispensed for use the untreated portions of the latex coating are very cohesive and are adapted to be brought into light pressure contact to form a homogeneous membrane of latex of double thickness as compared with the coating of latex on the blank.

While the invention has been disclosed for use in connection with particular forms of container blanks, it will be understood that it may be also used with a wide variety of blank shapes to produce cartons of any size and construction desired. While for economical reasons it is most expedient to use paper as the sheet backing stock, it may in some cases be desirable to utilize other materials such as fabric, foils, and plastic films. Likewise it will be understood that the particular means and method of rendering zones of the latex coating non-adherent are subject to wide variation and in addition, or in lieu, of the pulverulent materials, various other coatings may be added including the use of paper or other sheet stock or the application of varnish-like coatings. Likewise these zones of the coating may be rendered non-cohesive by treating them with any of various well known accelerator compounds to accelerate vulcanization of these zones only.

Whenever the word "cohesive" is used in the specification and claims it shall be taken to mean the ability of the surface to adhere to itself or to another similar surface, and whenever the word "adhesive" is used it shall be taken to mean the ability of the surface to adhere to a dissimilar surface.

What I claim is:

1. A blank for a container comprising a bottom wall panel having a plurality of side wall panels extending from the edges of the bottom wall panel with the junction therebetween being defined by score lines, at least one of said side wall panels having a top wall panel extending from the edge thereof opposite the edge of said side wall panel connected with the bottom panel, said side wall panel and said top wall panel having a score line at the junction therebetween, said side and top wall panels having a relatively narrow peripheral edge portion extending around the free edges thereof and provided with a layer of substantially non-tacky, cohesive latex, the adjacent peripheral edge portions of adjacent side wall panels intersecting at each corner of the bottom wall panel to form an inside right angle and a score line extending diagonally from each corner of the bottom wall panel to the apex of each of said inside angles, the peripheral edge portions of an opposite pair of said side wall panels intersecting at the outer corners of said side wall panels to form an outside right angle corner and being separated from the body portion of said last mentioned pair of side wall panels by score lines which intersect and extend to the free edges of said pair of opposite side wall panels, a score line extending diagonally across said outside right angle corners at the junction of said last mentioned peripheral edge portions, said blank having the latex coating disposed within the boundries of said peripheral edge portions rendered non-cohesive and non-adherent.

2. A hermetically sealed container comprising a bottom wall panel, four side wall panels extending upwardly from the edges of the bottom wall panel and being connected thereto by a score line, one of said side wall panels having a top wall panel extending from the edge thereof opposite the edge of said last mentioned side wall panel connected to the bottom wall panel, the side wall panels and said top wall panels having relatively narrow peripheral edge portions extending around the free edges thereof, said peripheral edge portions being connected at the lower ends of the side walls by diagonally extending score lines with the peripheral edge portions extending outwardly beyond the plane of adjacent side walls and secured together by said layer of latex, the upper corners of a pair of opposite side walls having a diagonal score line extending across the junction of said peripheral edge portions to form at each corner of the container triangular pleats at the outer faces of said last mentioned pair of side walls, the peripheral edge portions along the upper edge of each of said last mentioned pair of side walls being bent outwardly perpendicular to the plane of said last mentioned side walls, said top wall having the peripheral edge portions along opposite sides thereof bonded by said latex to the outwardly bent peripheral edge portions of said pair of side walls and having the peripheral edge portion along its third free side bonded by said latex to the peripheral edge portion along the upper side of the side wall panel opposite that to which said top wall panel is connected.

References Cited in the file of this patent

UNITED STATES PATENTS

| | | |
|---|---|---|
| 2,036,542 | Rosenthal | Apr. 7, 1936 |
| 2,046,975 | Shaw et al. | July 7, 1936 |
| 2,086,126 | Gilchrist | July 6, 1937 |
| 2,409,460 | Waters | Oct. 15, 1946 |
| 2,432,075 | Jennings | Dec. 2, 1947 |
| 2,692,078 | Lange | Oct. 19, 1954 |

FOREIGN PATENTS

| | | |
|---|---|---|
| 406,779 | Italy | Dec. 10, 1943 |
| 284,648 | Switzerland | Nov. 17, 1952 |